US008559163B2

(12) United States Patent
Naito et al.

(10) Patent No.: US 8,559,163 B2
(45) Date of Patent: Oct. 15, 2013

(54) REACTION VESSEL FOR PRODUCING CAPACITOR ELEMENT, PRODUCTION METHOD FOR CAPACITOR ELEMENT, CAPACITOR ELEMENT AND CAPACITOR

(75) Inventors: Kazumi Naito, Chiba (JP); Katutoshi Tamura, Chiba (JP)

(73) Assignee: Showa Denko K. K., Tokyo (JP)

( * ) Notice: Subject to any disclaimer, the term of this patent is extended or adjusted under 35 U.S.C. 154(b) by 120 days.

(21) Appl. No.: 11/219,731

(22) Filed: Sep. 7, 2005

(65) Prior Publication Data

US 2006/0051928 A1  Mar. 9, 2006

Related U.S. Application Data

(60) Provisional application No. 60/610,548, filed on Sep. 17, 2004.

(30) Foreign Application Priority Data

Sep. 9, 2004  (JP) .................................. 2004-262246

(51) Int. Cl.
*H01G 9/00*  (2006.01)

(52) U.S. Cl.
USPC ........ 361/523; 29/25.03; 204/227; 204/228.1

(58) Field of Classification Search
USPC ........... 29/25.03; 361/523–541; 204/227, 228
See application file for complete search history.

(56) References Cited

U.S. PATENT DOCUMENTS

| 4,192,721 | A | * | 3/1980 | Fawcett et al. ................ 205/229 |
| 4,377,986 | A | * | 3/1983 | Juve ............................... 118/696 |
| 4,487,666 | A | * | 12/1984 | Bates ............................... 205/82 |
| 4,785,380 | A | | 11/1988 | Harakawa et al. |
| 4,864,472 | A | * | 9/1989 | Yoshimura et al. ........... 361/525 |
| 4,906,538 | A | * | 3/1990 | Toyosawa et al. ............. 429/333 |
| 4,934,033 | A | | 6/1990 | Harakawa et al. |
| 6,071,387 | A | * | 6/2000 | Ohba ............................ 204/198 |
| 6,088,218 | A | * | 7/2000 | Hamada et al. ................ 361/523 |
| 6,139,592 | A | * | 10/2000 | Kamigawa et al. ........... 29/25.03 |
| 6,239,965 | B1 | * | 5/2001 | Shiraishi et al. ............... 361/511 |
| 2001/0011635 | A1 | * | 8/2001 | Terada et al. .................. 204/194 |
| 2003/0133256 | A1 | * | 7/2003 | Yoshida et al. ................ 361/523 |

FOREIGN PATENT DOCUMENTS

| JP | 59124620 A | * | 7/1984 |
| JP | 63-181308 | | 7/1988 |
| JP | 1-121919 | | 8/1989 |
| JP | 2-298010 | | 12/1990 |
| JP | 2836098 B2 | | 12/1990 |
| JP | 3-22516 | | 1/1991 |
| JP | 3-163816 | | 7/1991 |
| JP | 4-56445 | | 9/1992 |
| JP | 6-82592 | | 10/1994 |
| JP | 7-22080 | | 3/1995 |
| JP | 11-145007 | | 5/1999 |

* cited by examiner

*Primary Examiner* — H. Jey Tsai
(74) *Attorney, Agent, or Firm* — Sughrue Mion, PLLC

(57) ABSTRACT

The present invention relates to a reaction vessel for producing a capacitor element, which is used for forming a semiconductor layer by means of energization on two or more electric conductors each having formed on the surface thereof a dielectric layer simultaneously, by immersing the electric conductors into an electrolyte in the reaction vessel, the vessel comprising two or more negative electrode plates corresponding to the individual electric conductors and two or more constant current sources electrically connected to each of the negative electrode plates; production method for a group of capacitor elements using the reaction vessel and a capacitor using the capacitor element. According to the present invention, a large number of capacitors which each uses a semiconductor layer as one part electrode with a narrow appearance capacitance distribution can be obtained simultaneously.

10 Claims, 2 Drawing Sheets

REACTION VESSEL FOR PRODUCING CAPACITOR ELEMENT, PRODUCTION METHOD FOR CAPACITOR ELEMENT, CAPACITOR ELEMENT AND CAPACITOR

CROSS-REFERENCE TO RELATED APPLICATIONS

This is an application filed pursuant to 35 U.S.C. Section 111(a) with claiming the benefit of U.S. provisional application Ser. No. 60/610,548 filed Sep. 17, 2004 under the provision of 35 U.S.C. 111 (b), pursuant to 35 U.S.C. Section 119 (e)(1).

TECHNICAL FIELD

The present invention relates to a method for producing a capacitor element capable of attaining a stable capacitance appearance factor, a reaction vessel for producing the capacitor element, a capacitor element produced by using the production method or the reaction vessel described above, and a capacitor.

BACKGROUND ART

The capacitor utilized for CPU (central processing units) for personal computers and the like is required to have high capacitance and low ESR (equivalent serial resistance) so as to suppress the fluctuation of voltage and reduce the heat generation at the passing of a high ripple current.

Generally, as a capacitor for use in a CPU circuit, two or more aluminum or tantalum solid electrolytic capacitors are used.

Such a solid electrolytic capacitor is constituted by an aluminum foil having fine pores in the surface layer or a sintered body of a tantalum powder having fine pores in the inside as one part electrode (electric conductor), the dielectric layer formed on the surface of the electrode, and the other electrode (usually, semiconductor layer) provided on the dielectric layer.

The method for forming the semiconductor layer of the capacitor using a semiconductor layer as the other electrode includes, for example, a method of forming the semiconductor layer by means of energization described; for example, in the specification of JP. Nos. 1868722, 1985056, and 2054506. This is a method of forming the semiconductor layer by immersing an electric conductor having provided on the surface thereof a dielectric layer in a semiconductor layer-forming solution, and applying a voltage (passing a current) between the electric conductor serving as a positive electrode and an external electrode (negative electrode) prepared in the semiconductor layer-forming solution.

JP-A-3-22516 (the term "JP-A" as used herein means an "unexamined published Japanese patent application") describes a method of forming a semiconductor layer by passing a current having a DC bias current superimposed on an AC current to an electric conductor provided with a dielectric layer. Further, JP-A-3-163816 describes a method of bringing an electric conductor into contact with a chemical polymerization layer on a dielectric layer and forming a semiconductor layer on the chemical polymerization layer by electrolytic polymerization using the electric conductor as a positive electrode. Such methods involve problems in a case of forming a semiconductor layer in multiple conductors simultaneously. That is, the method described in JP-A-3-22516 involves a problem that a semiconductor layer is formed also on the negative electrode and the state of forming the semiconductor layer changes by lapse of the current supply time and, further, it is not ensured that the current flow is uniform to in each of the multiple electric conductors. Further, in the method described in JP-A No. 3-163816, since current is supplied by using the electric conductor placed outside as a positive electrode, it is not ensured that a semiconductor layer is uniformly formed in the inside of each of the electric conductors. Particularly, this results in a significant problem for an electric conductor of a large size whose inside pores are minute.

DISCLOSURE OF THE INVENTION

In the case of forming a semiconductor layer by means of energization on an electric conductor having formed thereon a dielectric layer as described above, for example, one hundred or more of electric conductors are processed on an industrial scale, by the number of several hundreds simultaneously, electric conductors are not necessarily uniform in properties or the semiconductor formation rate may vary among electric conductors. In particular, when a semiconductor layer is formed simultaneously on a large number of electric conductors, variation in the current value of the electrical current flowing through the electric conductors gives rise to production of capacitors uneven in the formation of semiconductor layer in some cases, and this makes it difficult to produce capacitors with stable capacitance.

Accordingly, an object of the present invention is to provide means for producing capacitor element (reaction vessels and producing method) capable of obtaining capacitors with a narrow variation in capacitance, in which formation of the semiconductor layer is stable in a case of forming a semiconductor layer of capacitors in two or more electric conductors by means of energization.

The present inventors have made an earnest study for solving the problem and, as a result, have found that a group of capacitors with a narrow variation in capacitance can be obtained by forming a semiconductor layer by supplying a constant current to an electric conductor, and have accomplished the present invention.

That is, the present invention provides a reaction vessel for producing a capacitor element, a method of producing a capacitor element, as well as a capacitor element, and a capacitor described below.

1. A reaction vessel for producing a capacitor element, which is used for forming a semiconductor layer by means of energization on two or more electric conductors each having formed on the surface thereof a dielectric layer simultaneously, by immersing the electric conductors into an electrolyte in the reaction vessel, the vessel comprising two or more negative electrode plates corresponding to individual electric conductors and two or more constant current sources electrically connected to each of the negative electrode plates.

2. The reaction vessel for producing a capacitor element as described in 1 above, wherein the constant current sources are constituted by two or more current regulative diodes with respective cathodes being electrically connected with each other and respective anodes being connected to the negative electrodes.

3. The reaction vessel for producing capacitor element as described in 1 or 2 above, wherein each of the negative electrodes disposed on the inner part at the bottom of the reaction vessel and each of the anodes of the current regulative diodes disposed outside of the reaction vessel are connected, and the cathodes of the current regulative diodes are electrically connected with each other, and whereby the current is collected to a terminal.
4. The reaction vessel for producing capacitor element as described in any one of 1 to 3 above, wherein each of the negative electrodes disposed on one face (surface) of an insulating substrate and each of the current regulative diodes disposed on the other face (back surface) of the insulating substrate are electrically connected through through holes, and the insulating substrate in which the through holes are sealed constitutes the bottom of the reaction vessel.
5. The reaction vessel for producing a capacitor element as described in 4 above, wherein the negative electrode plate is a film-like metal material.
6. A method for producing a capacitor element, using the reaction vessel for producing capacitor element as described in any one of 1 to 5 above.
7. A method for producing a capacitor element, wherein the reaction vessel for producing a capacitor element as described in any one of 1 to 5 above is filled with an electrolyte, two or more electric conductors each having formed on the surface thereof a dielectric layer are immersed in the electrolyte, and a semiconductor layer is formed on the dielectric layer by means of energization using the side of the electric conductors as a positive electrode and individual negative electrodes disposed in the reaction vessel as a negative electrode.
8. A group of capacitor elements manufactured by the production method described in 6 or 7 above.
9. A capacitor using a group of capacitor elements as described in 8 above, wherein variation in the obtained appearance capacitance is within a range of an average capacitance ±20%.

MODE FOR CARRYING OUT THE INVENTION

Examples of the electric conductor used in the present invention include a metal, an inorganic semiconductor, an organic semiconductor, a carbon, a mixture comprising at least one of these materials and a stacked body formed by stacking an electric conductor on the surface layer thereof.

Examples of the inorganic semiconductor include metal oxides such as lead dioxide, molybdenum dioxide, tungsten dioxide, niobium monoxide, tin dioxide and zirconium monoxide. Examples of the organic semiconductor include electrically conducting polymers such as polypyrrole, polythiophene, polyaniline and substitution product or copolymer having such a polymer skeleton, and low molecular complexes such as complex of tetracyanoquinodimethane (TCNQ) and tetrathiotetracene, and TCNQ salt. Further, examples of the stacked body obtained by stacking an electric conductor on the surface layer include stacked bodies where the above-described electric conductor is stacked on paper, insulating polymer, glass, etc.

In the case of using the metal as the electric conductor, the metal may be used after subjecting a part thereof to at least one treatment selected from carbidation, phosphation, boronation, nitridation, and sulfidation.

The shape of the electric conductor is not particularly limited and may be, for example, a foil, a plate, a bar or a shape after the electric conductor itself is formed into a powder and shaped or shaped and then sintered. The surface of the electric conductor may be treated by etching or the like to form fine pores. In a case where the electric conductor, after formed into a powder, is shaped or shaped and then sintered, fine pores can be formed in the inside after shaping or sintering by appropriately selecting the pressure at the shaping.

In the case where the electric conductor, after formed into a powder, a part of a separately prepared outgoing lead wire (or lead foil) may be shaped together with the electric conductor and the outgoing lead wire (or lead foil) outside the shaped portion may be used as the outgoing lead of one part electrode of the capacitor. Of course, an outgoing lead can also be directly connected to the electric conductor.

Further, a portion of the electric conductor may be used as an anode part by not, forming a semiconductor layer described later. An insulating resin may be deposited and cured in a headband shape at the boundary between the anode part and the semiconductor-forming part so as to prevent the semiconductor layer from creeping up.

Preferred examples of the electric conductor in the invention include a sintered body having many fine pores in the inside, which is obtained by shaping and then sintering a powder such as tantalum powder, niobium powder, alloy powder mainly comprising tantalum, an alloy powder mainly comprising niobium, and niobium oxide powder, and an aluminum foil having an etched surface.

The dielectric layer formed on the surface of the electric conductor of the invention include a dielectric layer mainly comprising at least one member selected from metal oxides such as $Ta_2O_5$, $Al_2O_3$, $TiO_2$, $Nb_2O_5$ and a dielectric layer conventionally known in the field of ceramic capacitors or film capacitors. In a case of the former dielectric layer mainly comprising at least one member selected from the former metal oxides, when the dielectric layer is formed by electrochemical formation of an electric conductor having a metal element of the metal oxide, the produced capacitor becomes an electric capacitor having the polarity. The dielectric layer conventionally known in the field of ceramic capacitors or the film capacitors include dielectric layers described in JP-A-63-29919 and JP-A-63-34917 both filed by the present applicant. Further, the dielectric layer mainly comprising at least one member selected from metal oxides or the dielectric layer conventionally known in the field of ceramic capacitors or the film capacitors may be used by stacking two or more these layers. Further, it may be a dielectric layer formed by mixing the dielectric material mainly comprising at least one member selected from the metal oxides and the dielectric material conventionally known in the ceramic capacitors or film capacitors.

Specific example for forming the dielectric layer by electrochemical formation is to be described.

A dielectric layer is formed on the surface layer of the electric conductor by arranging two or more elongate metal plates, which connected with two or more electric conductors at an equal distance, in parallel with the direction being aligned to a metal frame, dipping the anode part or a portion of a lead wire (lead foil) and an electric conductor in a solution for chemical formation in a separately provided chemical formation tank, applying a voltage for a predetermined time between the metal frame serving as an anode and the negative electrode plate in the chemical formation tank, and then pulling up, cleaning and drying the same.

On the other hand, the other electrode of the capacitor in the invention include at least one compound selected from organic semiconductors and inorganic semiconductors and it is important to form the compound by means of energization which is described later.

Specific examples of the organic semiconductor include an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

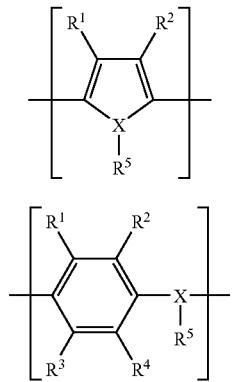

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or nitrogen atom, $R^5$ is present only when X is a nitrogen atom, and represents a hydrogen atom or an alkyl group having from 1 to 6 carbon atoms, and each of the pairs $R^1$ and $R^2$, and $R^3$ and $R^4$ may combine to form a cyclic structure.

Further, in the invention, the polymer containing a repeating unit represented by formula (1) is preferably a polymer containing, as a repeating unit, a structure unit represented by the following general formula (3):

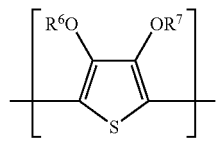

wherein $R^6$ and $R^7$ each independently represents a hydrogen atom, a linear or branched, saturated or unsaturated alkyl group having from 1 to 6 carbon atoms, or a substituent for forming at least one 5 to 7-membered saturated hydrocarbon cyclic structure containing two oxygen atoms when the alkyl groups are combined with each other at an arbitrary portion. Further, the cyclic structure also includes a structure having a vinylene bond which may be substituted, and a phenylene structure which may be substituted.

The electrically, conducting polymer containing such a chemical structure is being electrically charged and a dopant is doped therein. The dopant is not particularly limited and a known dopant can be used.

Preferred examples of the dopant include a compound having a sulfonic acid group. Representative examples of such a compound include a sulfonic acid having an aryl group, such as benzenesulfonic acid, toluenesulfonic acid, naphthalenesulfonic acid, anthracenesulfonic acid, benzoquinonesulfonic acid, naphthoquinonesulfonic acid and anthraquinonesulfonic acid; a sulfonic acid having an alkyl group, such as butylsulfonic acid, hexylsulfonic acid, and cyclohexylsulfonic acid; various polymer (polymerization degree: from 2 to 200) sulfonic acids such as polyvinyl sulfonic acid, and a salt (for example, ammonium salt, alkali metal salt, alkaline earth metal salt) of these sulfonic acids.

The compounds may have various substituents and may have a plurality of sulfonic acid groups. A plurality of dopants may be used in combination.

Examples of the polymer containing a repeating unit represented by the formula (1), (2) or (3) include polyaniline, polyoxyphenylene, polyphenylene sulfide, polythiophene, polyfuran, polypyrrole, polymethylpyrrole, and substitution derivatives or copolymers thereof. Among these, preferred are polypyrrole, polythiophene and substitution derivatives thereof (for example, poly(3,4-ethylenedioxythiophene)).

Specific examples of the inorganic semiconductor include at least one compound selected from molybdenum dioxide, tungsten dioxide, lead dioxide, and manganese dioxide.

When the organic semiconductor or the inorganic semiconductor used has an electrical conductivity of $10^{-2}$ to $10^3$ S/cm, the capacitor produced can have a small ESR value and this is preferred.

The semiconductor layer described above is usually formed by pure chemical reaction (for example, a solution reaction, a gas phase reaction, a solid-liquid reaction or a combination thereof) or formed by means of energization or by a combination of these methods. In the invention, the energization is employed at least once in the step of forming the semiconductor layer. In forming the semiconductor layer by means of energization, at least one energization operation is performed by using a constant current power supply (constant current source) for applying current, whereby the object of the present invention can be achieved.

The constant current source may be sufficient if a constant current circuit capable of applying a constant current to the electric conductor having on the surface thereof a dielectric layer can be established. The constant current source is preferably constituted, for example, by a current regulative diode where the circuit is simple and the number of parts can be made small. The current regulative diode may be commercially available current regulative diode or may be constituted by a field effect transistor. Other constant current sources than described above include those using transistors, those using IC, and those using three-terminal voltage regulators or the like.

In the following, the constant current source is described mainly by referring to the case of using a current regulating diode, but the constant current source is not limited thereto.

The reaction vessel for producing multiple capacitor elements simultaneously according to the invention is composed such that negative electrode plates are disposed at the bottom of individual compartment inside the reaction vessel, each of the negative electrode plates is connected with the anode of respective current regulative diodes and, the cathodes of the current regulative diodes are electrically connected with each other, to thereby collect the current into a terminal. Metal frames in which multiple electric conductors each having a dielectric layer described above in relation to the chemical formation are arranged, are disposed at the top of the reaction vessel for producing the capacitor element of the present invention filled with the electrolyte for forming the semiconductor layer. Multiple electric conductors connected with the metal frames are disposed in respective compartments in the reaction vessel, and when a voltage is applied between the metal frame and the collecting terminal of the group of the current regulative diodes, a constant current according to the rank (current standard) of the current regulative diode flows (the regulative diode may also be selected to give a specific current range). This current forms a semiconductor layer on the dielectric layer of the electric conductor. In the current regulative diode, when a voltage within a prescribed range is applied in the forward direction (the direction of the current regulative diode) from the anode to the cathode, a predetermined constant current passes. Since the current value can be changed stepwise by selecting the current regulative diode of a suitable rank or using two or more current regulative diodes in parallel or in a combination of serial and parallel connections, a constant current in an arbitrary range can be supplied by selecting the current regulative diode according to the size of the electric conductor or the desired amount of the semiconductor to be formed.

Each of the current regulative diodes is preferably disposed outside of the individual compartments in the reaction vessel so that the current regulative diode is not interfered by the negative electrode plates disposed inside of the bottom of the reaction vessel and the size of the reaction vessel can be reduced. In this case, holes in the reaction vessel for connection wirings between the negative electrode plate inside the reaction vessel and the current regulative diode outside of the reaction vessel can be closed (sealed) by a resin or the like.

Specific embodiments of the present invention are to be described below with reference to the accompanying drawings.

FIG. 1 is a schematic view showing one example of a reaction vessel for producing capacitor element (1), and FIG. 2 is a plan view (surface view) showing an example of a preferred arrangement of the negative electrode plates and the current regulative diodes for the reaction vessel of the present invention, and FIG. 3 is a back surface view showing the back side.

There can be mentioned a constitution in which a film-like metal material formed by means of printing technique on one side of an insulating substrate (disc-shape in the illustrated embodiment) serves as a negative electrode plate and, after arranging current regulative diodes (3) at predetermined portions in printed wiring on the back surface of the insulating substrate through through holes therein, the through holes are sealed with an insulating resin such as an epoxy resin. The through hole structure is preferred since electrical connections can be easily taken between the front surface and the back surface because printed wirings are applied in the inside of the through holes. Thus, a reaction vessel (1) in which the insulating substrate having multiple negative electrode (2) and each of the current regulative diodes (3) disposed thereon is used as the bottom of the reaction vessel and a frame is fabricated with insulating resin so as to surround the insulating substrate can be used. Further, it may also adopt a structure in which frames (6) each of a predetermined height are disposed so as to be vertical to the substrate at predetermined positions of the insulating substrate to thereby prepare multiple compartments for containing each of the negative electrode plates in the reaction vessel so that each of the compartments is filled with electrolyte for forming the semiconductor layer. It is preferred to design a structure such that the individual electric conductors having the dielectric material formed thereon may be immersed in the individual compartments of the reaction vessel for the purpose of supplying a desired current to each of the electric conductors without fail. A negative electrode plate electrically connected only with the negative electrode plate at the bottom of each compartment may also be provided previously for some or all of the frames of a predetermined height.

The size of the reaction vessel of the present invention can be decided properly in accordance with the volume and the number of the electric conductors to be prepared at once and the size of the negative electrode plate.

The individual negative electrode plates disposed on the bottom of the reaction vessel are designed such that they are insulated electrically from each other and the lower surface of one electric conductor is opposed to each of the negative electrode plates. It is desirable that the size of the negative electrode plate is larger than the lower surface of the electric conductor to be used. However, if it is excessively large, it is disadvantageous in view of the cost since this also increases the size of the reaction vessel and increases the amount of the electrolyte for forming the semiconductor layer to be used. With the reasons as described above, the size of the negative electrode plate is determined by conducting a preliminary experiment to be the minimum size within a range that current for forming a sufficient semiconductor layer can be supplied to the electric conductor. In a case where the lower surface of the electric conductor is in a rectangular shape, the size of the negative electrode plate is desirably about from 1.01 to 3 times, preferably, 1.01 to 1.5 times the area of the rectangular shape.

As the material for the negative electrode plate, an electric conductor non-corrosive to the electrolyte for forming the semiconductor layer can be used. For example, iron alloy, copper alloy, tantalum, platinum, etc. are used. At least one layer of an electric conductor non-corrosive to the electrolyte, for example, nickel, gold, silver, solder, etc. may be plated to the surface of the negative electrode plate. In a case of laminating such a plating layer to the surface, a corrosive electric conductor, for example, copper or aluminum can also be used.

Two or more negative electrode plates can also be provided in a single compartment. For example, in a case where two negative electrode plates are placed in one compartment, it is necessary to connect both of the negative electrode plates to one constant current source present at the back surface and therefore the number of the constant current sources used are not two. Preferably, a single negative electrode plate of a size accommodatale in one compartment is disposed.

The reaction vessel for producing the capacitor elements of the invention has the individual negative electrode plates described above which is electrically connected to a current suction-type constant current source. In the case of constituting the constant current source by using a current regulative diode, examples of constitutions of the vessel include one where respective cathodes of two or more current regulative diodes are electrically connected and to the anode of each current regulative diode, the negative electrode plate is electrically connected in series.

Description is to be made more specifically based on the example of the reaction vessel for producing capacitor elements shown in FIG. 1. Two or more negative electrode plates (2) are present independently in each of the compartments at the bottom of the reaction vessel (1), and the anode of the current regulative diode (3) at the outside of the bottom of the reaction vessel is connected in series with each of the negative electrode plates. An electrolyte (not illustrated) for forming the semiconductor layer is filled in each of the compartments at a substantially equal height so as not to exceed the height of the compartment.

FIG. 3 is a schematic view for the bottom of the reaction vessel as viewed from the outside. Two or more current regulative diodes (3) are arranged in parallel at even intervals, and the cathodes for the respective current regulative diodes are electrically connected with each other and connected to a current collecting terminal (4) shown in the upper left of the drawing. FIG. 2 is a schematic view of the reaction vessel as viewed from above. Two or more negative electrode plates (2) are arranged at even intervals. Individual negative electrode plates are insulated from each other and connected to the anodes of the current regulative diodes in FIG. 3 through through holes (not illustrated) formed by the same number as the negative electrode plates at the bottom of the reaction vessel. Each of the through holes is sealed with an insulating resin or ceramics, so that the electrolyte in the reaction vessel does not exude. A metal frame, formed by integrating two or more metal plates arranged at even intervals to which conductors (5) each having a the dielectric layer formed on the surface are connected at even intervals, is disposed at the upper part of the reaction vessel. Each of the conductors is immersed one by one in predetermined amount of electrolyte in a each of the compartments disposed in the reaction vessel.

Next, a method of forming a semiconductor layer by means of energization using the reaction vessel for producing the capacitor element is described.

After filling each of the compartments of the reaction vessel with an electrolyte for forming the semiconductor layer to almost the same height so as not to exceed the height of the compartment, each of the electric conductors arranged at even intervals on the metal frame and each having a dielectric layer on the surface are immersed in each of the compartments. A semiconductor layer is formed by means of energization using the metal frame as the positive electrode and the current collecting terminal disposed outside the bottom of the reaction vessel as the negative electrode.

By adding a current through the semiconductor layer forming solution in which the raw materials to form a semiconductor layer after energization and optionally added dopant as described above (for example, a known dopant such as arylsufonic acid or its salt, alkylsulfonic acid or its salt, various polymer sulfonic acids or their salts) are dissolved, a semiconductor layer is formed on the dielectric layer.

The energization time, concentration of the solution for forming the semiconductor layer, pH, temperature, the energization current and voltage value vary depending on the kind, size and mass of electric conductor used, the desired thickness of semiconductor layer formed, or the like and therefore, these conditions are previously decided by performing a preliminary experiment. Also, the energization may be performed multiple times by changing the energization conditions. Further, for repairing defects of the dielectric layer formed on the surface of the electric conductor, a conventionally known re-electrochemical forming operation may be performed at an arbitrary stage (either once or multiple times) on the way and/or at the final stage of the formation of semiconductor layer.

Further, after producing electrical fine defects in the dielectric layer formed on the surface of the electric conductor layer, the semiconductor layer may be formed by the method of the present invention.

In the capacitor of the present invention, an electrode layer may be provided on the semiconductor layer formed by the above-described method or the like so as to attain good electrical contact with an external outgoing lead (for example, lead frame) of the capacitor.

The electrode layer may be formed, for example, by solidification of electrically conducting paste, plating, vapor deposition of metal, attachment of heat resistant electrically conducting resin film. Preferred examples of the electrically electrically conducting paste include silver paste, copper paste, aluminum paste, carbon paste and nickel paste, and these may be used individually or in combination them or more thereof. In the case of using two or more pastes, the pastes may be mixed or may be superposed one on another as separate layers. The electrically conducting paste applied is then solidified by allowing it to stand in air or under heating. The thickness of the electrically conducting paste after solidification is usually about 0.1 to about 200 μm per one layer.

The electrically conducting paste mainly comprises a resin and an electrically conducting powder such as metal and if desired, may contain a solvent for dissolving the resin, a curing agent for resin, and the like. The solvent dissipates at the solidification.

As for the resin in the electrically conducting paste, various known resins such as alkyd resin, acryl resin, epoxy resin, phenol resin, imide resin, fluoro resin, ester resin, imideamide resin, amide resin, styrene resin, urethane resin and the like are used. As for the electrically conducting powder, at least one of the powder of silver, copper, aluminum, gold, carbon, nickel or an alloy mainly comprising such a metal, a coated powder having such a metal on the surface layer, or a mixed powder thereof is used.

The electrically conducting powder is usually contained in an amount of 40 to 97 mass %. If the content is less than 40 mass %, the produced electrically conducting paste is disadvantageously low in the electrical conductivity, whereas if it exceeds 97 mass %, adhesion of the electrically conducting paste becomes lower and this is not preferred. The electrically conducting paste may be used after mixing thereto an electrically conducting polymer described above for forming the semiconductor layer or a powder of metal oxide.

Examples of the plating include nickel plating, copper plating, silver plating, gold plating, aluminum plating. Examples of the metal vapor-deposited include aluminum, nickel, copper, gold, silver.

Specifically, for example, a carbon paste and a silver paste are stacked in this order on the electric conductor formed with the semiconductor layer and molded with a material such as an epoxy resin to fabricate a capacitor. The capacitor may have a lead comprising a metal wire or metal foil previously or afterward connected to the electric conductor.

The capacitor of the present invention having such a constitution is jacketed, for example, by resin mold, resin case, metallic jacket case, resin dipping or laminate film and thereby, can be completed as a capacitor product for various uses.

Among these, a chip capacitor jacketed by resin mold is preferred, because reduction in the size and cost can be achieved.

The case of jacketing the capacitor by resin mold is specifically described. A part of the electrically conducting layer of the capacitor element obtained as above is laid on one end part of a separately prepared lead frame having a pair of oppositely disposed end parts, and a part of the anode lead part (in order to adjust the dimension, the anode lead may be used after cutting the distal end thereof) is laid on another end part of the lead frame. After electrically or mechanically joining, for example, the former by solidification of an electrically conducting paste and the latter by welding, the entirety is molded with a resin while leaving outside a part of each end part of the lead frame, and the lead frame is cut and bent at predetermined portions outside the resin molding (when the lead frame is present on the bottom surface of resin molding and the entirety is molded while leaving only the bottom surface or the bottom and side surfaces of the lead unmolded, the lead frame may be only cut without bending treatment), whereby the capacitor of the present invention is produced.

The lead frame is cut as described above and finally works out to an external terminal of the capacitor. The shape thereof is a foil or tabular form and the material used therefor is iron, copper, aluminum or an alloy mainly comprising such a metal. The lead frame may be partially or entirely plated with solder, tin, titanium, gold, nickel or the like. Between the lead frame and the plating, a primer plating such as nickel and copper may be provided.

After or before the above-described cutting and bending steps, the lead frame may be plated by these various metals or alloys. It is also possible to plate the lead frame before mounting and connecting the capacitor element and re-plate it at an arbitrary time after molding.

In the lead frame, a pair of oppositely disposed end parts are present and a gap is provided between end parts, whereby the anode part and the cathode part of each capacitor element are insulated from each other.

As for the kind of the resin used for resin mold jacketing, a known resin for use in the molding of a solid electrolytic capacitor, such as epoxy resin, phenol resin and alkyd resin, can be employed, but each resin is preferably a low-stress resin, because when such a resin is used, the molding stress on the capacitor element, which is generated at the molding, can be mitigated. The production machine for performing the molding with resin is preferably a transfer machine.

The thus-produced capacitor may be subjected to an aging treatment so as to repair the thermal and/or physical deterioration of the dielectric layer, which is caused at the formation of electrode layer or at the jacketing.

The aging is performed by applying a predetermined voltage (usually, within 2 times the rated voltage). The optimal values of aging time and temperature vary depending on the kind and capacitance of capacitor and the rated voltage and are previously determined by performing an experiment, but the aging time is usually from several minutes to several days and the aging temperature is usually 300° C. or less in consideration of heat deterioration of the voltage-applying jig. As for the aging atmosphere, the aging may be performed in any one condition of reduced pressure, atmospheric pressure and applied pressure. Also, the aging atmosphere may be an atmosphere of air or a gas such as argon, nitrogen and helium, but is preferably a water-vapor atmosphere. When the aging is performed in an atmosphere containing water vapor and then performed in air or a gas such as argon, nitrogen and helium, the stabilization of the dielectric layer sometimes proceeds. It is also possible to perform the aging by supplying water-vapor atmosphere and then restore normal pressure and room temperature, or supplying water-vapor atmosphere and then allowing the capacitor to stand in an air at 150 to 250° C. for several minutes to several hours. Examples of the method for supplying the water vapor include a method of supplying water vapor from a water reservoir placed in the aging furnace by using heat.

As for the method of applying a voltage, an arbitrary current such as direct current, alternating current having an arbitrary waveform, alternating current superposed on direct current, and pulse current can be designed to pass. It is also possible to once stop the voltage application on the way of aging and again apply a voltage.

The capacitance of capacitors produced by the present invention is stable since the semiconductor layer can be formed under constant conditions. As a result, the capacitance variation among a capacitor group (a large number of capacitors produced at the same time) is narrow as compared with conventional products. Therefore, in the case of obtaining capacitors having a specific capacitance range, the selection according to the capacitance is not necessary, or even if the selection is necessary, the yield is elevated.

The capacitor group produced by the present invention can be used in digital devices such as a personal computer, server, camera, game machine, DVD equipment, AV equipment and cellular phone, and electronic devices such as various power sources.

BEST MODE FOR CARRYING OUT THE INVENTION

The present invention is described in greater detail by referring to Examples, however, the present invention is not limited to these Examples.

Example 1

1. Production of a Reaction Vessel for Producing Capacitor Element

Figure 1:
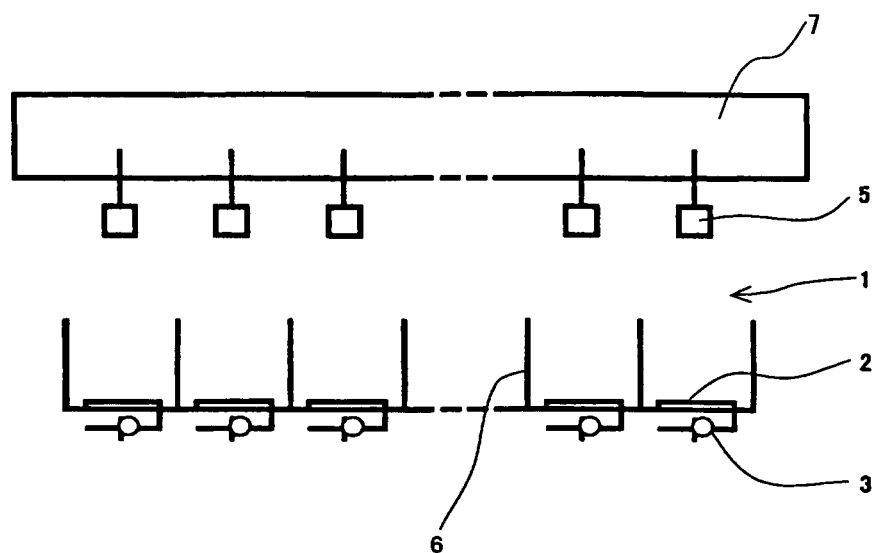
FIG. 1 is a schematic view showing the constitution according to one embodiment of the reaction vessel for producing capacitor elements of the present invention.
Figure 2:
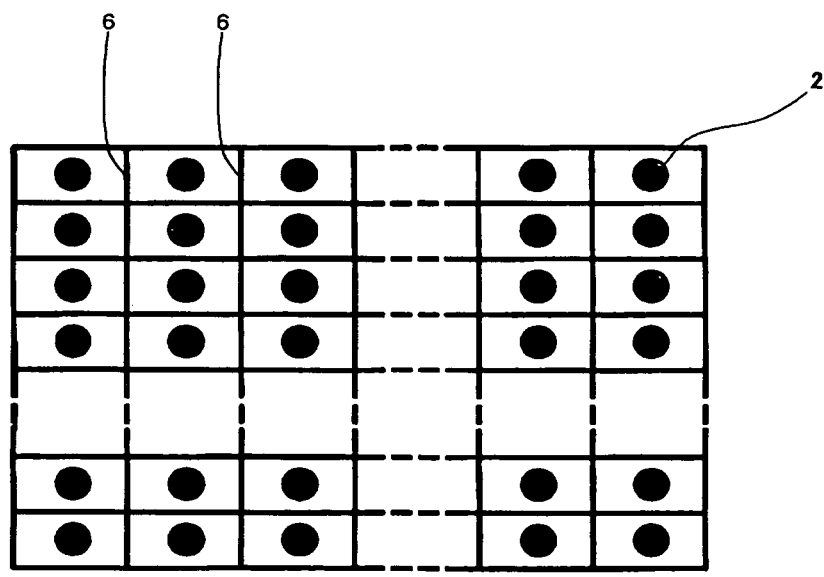
FIG. 2 is a schematic view showing the constitution of an inner face (surface) at the bottom of a reaction vessel according to one embodiment of the reaction vessel for producing capacitor elements of the present invention.
Figure 3:
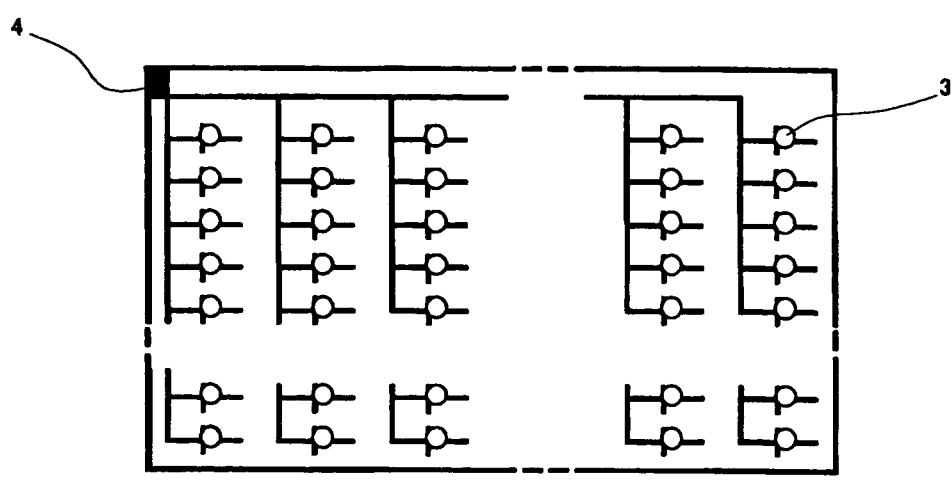
FIG. 3 is A schematic view showing the constitution of the back surface at the bottom of a reaction vessel according to one embodiment of the reaction vessel for producing capacitor elements of the present invention.

On one face (front surface) of a copper-clad glass epoxy plate having a length of 322 mm, a width of 202 mm and a thickness of 2 mm, 640 in total negative electrode plates each formed by applying gold plating on a copper material of 7 mm diameter in printing wiring as shown in FIG. 2 were disposed at even intervals, where 32 pieces were arranged in the length direction and 20 pieces were arranged in the width direction. Further, to the other face (back surface), printed-wiring was applied such that the anode side of the current regulative diodes and respective negative electrode plates on the front surface are serially connected through through holes as shown in FIG. 3. The cathode part of each of the current regulative diodes is connected by soldering to the land of the printed wirings and connected by wirings leading S to the current collecting terminal. As the current regulative diodes, those of 120 to 160 µA were selected from F-101 manufactured by Ishizuka Electronics Corporation. The through holes were sealed with an epoxy resin. Then, glass epoxy plates each having a height of 20 mm and a width of 2 mm were erected vertically to the surface and fixed to the surface by an adhesive resin, so that 640 compartments each having almost the same size (8×8 mm in planar size) in which each of the negative electrode plates present on the surface, to whereby prepare a reaction vessel for producing capacitor elements with compartments each having a cross-section as shown as in FIG. 1.

2. Manufacture of Capacitor

A tantalum sintered body (having a size of 4.5×3.0×1.0 mm and a mass of 84 mg and an outgoing lead wire of 0.40 mmϕ with 7 mm end of the wire protruding from the surface) with CV of 100,000 µF·V/g was used as the electric conductor. In order to prevent solution from splashing up at the later step for forming a semiconductor layer, a tetrafluoroethylene-made washer was attached to the lead wire. The thus prepared 32 lead wires of the electric conductors were connected in the same direction by welding, at the upper 2 mm portion thereof, to a stainless plate having a length of 360 mm, a width of 20 mm and a thickness of 2 mm, each at intervals of 10 mm from a 25 mm position from the end of the stainless steel plate, while aligning the direction. 20 sheets of thus prepared stainless steel plate connected with 32 electric conductors in the same manner as above were attached in parallel with each other at intervals of 10 mm to a metal frame. in which 640 electric conductors can be arranged in one direction, while aligning the edges of the stainless steel plates. The frame was placed above a separately prepared electrochemical formation tank containing an aqueous 0.1% phosphoric acid solution, and arranged the electric conductors and a part of the lead wires could be immersed in the aqueous solution. Then, 10 V was applied using the frame as the positive electrode and the tantalum plate disposed in the electrochemical formation tank as a negative electrode, chemical formation was conducted at a temperature of the aqueous solution of 80° C. for 6 hours. The frame was then pulled up from the electrochemical formation tank, washed with water and dried to form a dielectric layer comprising $Ta_2O_5$ on the inside of the pores, the surface of the electric conductors and to a portion of the lead wires. Then, after repeating 7 times the procedure of immersing only the electric conductors of the frame in an aqueous solution of 1% iron naphthalene-2-sulfonate, pulling up, washing with water and drying the same, the frame was placed such that each of the 640 electric conductors the frame was immersed in each of the 640 compartments the reaction vessel for producing the capacitor elements respectively which was filled with an aqueous solution of 30% ethylene glycol incorporated with 3% anthraquinone-2-sulfonic acid and ethylenedioxythiophene of a saturated concentration or higher to the same height. By using as anode the frame and using as cathode the current collecting terminal at the bottom outside the reaction vessel, energization was performed by applying a voltage of 13.5 V to electric conductors at room temperature for 1 hour to form a semiconductor layer. After pulling up, water washing, alcohol cleaning and drying the frame, it was disposed such that the electric conductors and the portion of the lead wires were immersed in the above-described electrochemical formation tank containing 0.1% acetic acid as the chemical formation solution. Re-electrochemical formation was performed by applying a voltage of 7 V to the electric conductors at 80° C. for 15 minutes. The frame was pulled up, washed with water, cleaned with alcohol and then dried. This process of forming a semiconductor layer and performing the re-electrochemical formation was repeated five times to obtain a final semiconductor layer. Further, the frame was disposed such that the electric conductors were immersed sequentially in a carbon paste tank and in a silver paste tank and then dried, whereby an electrode layer was stacked on the semiconductor layer.

Individual electric conductors after the formation of the electrode layer were removed from the frame. On two end parts of a separately prepared lead frame having a tin-plated surface, the lead wire of the electric conductor was laid in the anode side while cutting and removing a part of the lead wire and connected by spot welding and the silver paste side of the electric conductor was laid in the cathode side and connected by a silver paste. Thereafter, the entirety of the lead frame was molded with epoxy resin, and then the lead frame was cut and bent to produce a chip capacitor having a size of 7.3×4.3×1.8 mm. Thereafter, this capacitor was subjected to aging at 115° C. while applying a voltage of 3.5 V to the capacitor for 5 hours. The variation in the appearance capacitance of the obtained capacitors is within a range of an average capacitance ±10%. In particular, the capacitors obtained had a capacitance of 680 μF at a rated voltage of 2.5 V and the capacitance distribution thereof was such that the number of capacitors in the range of 720 to 645 μF was 594, the number of capacitors in the range of 720 to 750 μF was 17, and the number of capacitors in the range of 645 to 610 μF was 29.

Comparative Example 1

Chip capacitors were manufactured in the same manner as in Example 1 except that instead of the reaction vessel for producing the capacitor elements of the present the invention, a conventional reaction vessel, in other words, a reaction vessel having an identical size as that of the invention, having none of individual compartments, individual negative electrode plates and current suction-type current sources, in which vessel with a negative electrode plate applied with gold plating on copper of almost the same size with the bottom area was provided in the lower part, was used and that by using the negative electrode plate as a negative electrode and passing a current, a semiconductor layer was formed in the vessel. The variation in the appearance capacitance of the obtained capacitors exceeds an average capacitance ±20%. In particular, the capacitors obtained had a capacitance of 680 μF at a rated voltage of 2.5 V and the capacitance distribution thereof was such that the number of capacitors in the range of 720 to 645 μF was 359, the number of capacitors in the range of 720 to 750 μF was 15, the number of capacitors in the range of 750 to 780 μF was 2, the number of capacitors in the range of 645 to 610 μF was 150, the number of capacitors in the range of 610 to 575 μF was 93, the number of capacitors in the range of 575 to 540 μF was 17 and the number of capacitors in the range of 540 to 510 μF was 4.

As seen from the results in Example 1 and Comparative Example 1, the capacitor group obtained in Example 1 has apparently a narrower capacitance distribution than the capacitor group obtained in Comparative Example 1.

Example 2

1. Preparation of a Reaction Vessel for Producing Capacitor Element

A reaction vessel, which was the same with that of Example 1 except that instead of preparing the negative electrode plates for the compartments of the reaction vessel by the printing technique, the negative electrode plates were prepared by drawing a solid painted portion of a thickness of about 0.3 mm to the bottom and the lateral surface up to a height of 14 mm from the bottom of each of small compartments with a silver paste comprising 93 mass % of a silver powder and 7 mass % of epoxy resin and that current regulative diodes of 60 to 100 μA selected from F-101L manufactured by Ishizuka Electronics Corporation were used.

2. Manufacture of Capacitor

A niobium primary powder (average particle diameter: 0.32 μm) ground by utilizing hydrogen embrittlement of a niobium ingot was granulated to obtain a niobium powder having an average particle diameter of 110 μm (this niobium powder was fine powder and therefore, naturally oxidized to contain 95,000 ppm of oxygen) The obtained niobium powder was left standing in a nitrogen atmosphere at 450° C. and further in argon at 700° C. to obtain a partially nitrided niobium powder (CV 298000 pF-V/g) having a nitrided amount of 9,600 ppm. The resulting niobium powder was molded together with a niobium wire of 0.37 mmf and the molded article was sintered at 1280° C. In this way, multiple sintered bodies (electric conductors) having size of 4.0×3.5×1.7 mm (having 0.08 g of mass, the niobium wire was present such that 3.7 mm was inside the sintered body and 8 mm was outside the sintered body to serve as a lead wire). Then, after connecting the same number of the electric conductors to the same kind of stainless plate as in Example 1 by the same number, the same number of thus prepared plates were arranged on a metal frame. A dielectric layer comprising $Nb_2O_5$ as the main ingredient was formed to the surface of the electric conductors and a portion of the lead wires by chemical formation in the same manner as in Example 1 only except that the voltage was 20 V.

Then, after placing the reaction vessel for producing capacitor elements in a low temperature room controlled to 12° C., a semiconductor layer and an electrode layer were formed in the same manner as in Example 1 except for replacing anthraquinone-2-sulfonic acid in Example 1 with pyrrole, changing the current supply voltage and the re-chemical formation voltage to 23 V and 14 V respectively and, further, changing the number of reactions to 11 times at the current supply time of 90 min, and they were sealed to manufacture chip solid electrolytic capacitors having a size of 7.3×4.3×2.8 mm. The variation in the appearance capacitance of the obtained capacitors is within a range of an average capacitance ±15%. In particular, the obtained capacitors had a capacitance of 1000° F. at a rated voltage of 4 V and the capacitance distribution thereof was such that the number of capacitors in the range of 950 to 1050 μF was 579, the number of capacitors in the range of 1050 to 1100 μF was 13, the number of capacitors in the range of 950 to 900 μF was 44 and the number of capacitors in the range of 900 to 850 μF was 4.

Comparative Example 2

Chip solid electrolytic capacitors were manufactured in the same manner as in Example 2 except for producing capacitors not using the reaction vessel for producing capacitor elements of the invention but using the conventional reaction vessel used in Comparative Example 1. The variation in the appearance capacitance of the obtained capacitors exceeds an average capacitance ±20%. In particular, the obtained capacitors had a capacitance of 1000 μF at a rated voltage of 4 V and the capacitance distribution thereof was such that the number of capacitors in the range of 950 to 1050 μF was 365, the number of capacitors in the range of 1050 to 1100 μF was 7, the number of capacitors in the range of 950 to 900 μF was 172, the number of capacitors in the range of 900 to 850 μF was 68, the number of capacitors in the range of 850 to 800 μF was 19, the number of capacitors in the range of 800 to 750 μF was 6 and the number of capacitors in the range of 750 to 7000 μF was 3.

As seen from the results in Example 2 and Comparative Example 2, the capacitor group obtained in Example 2 has apparently a narrower capacitance distribution than the capacitor group obtained in Comparative Example 2.

INDUSTRIAL APPLICABILITY

The present invention provides a reaction vessel for producing capacitor elements and a method of producing capacitor elements, where a semiconductor layer is formed by passing a current through a constant current source. According to the invention, a capacitor group having a narrow appearance capacitance distribution and a capacitance distribution in which the appearance capacitance is within a range of average capacitance ±20%.

The invention claimed is:

1. A method for producing a capacitor element using a reaction vessel for forming a semiconductor layer by means of energization on two or more electric conductors each having formed on the surface thereof a dielectric layer simultaneously, which comprises immersing the electric conductors into an electrolyte in the reaction vessel and passing an electric current through the electrolyte, the vessel comprising two or more negative electrode plates each corresponding to individual electric conductors and two or more constant current sources electrically connected to individual negative electrode plates,
wherein a constant electric current passes through individual ones of the two or more electric conductors in forming the semiconductor layer, and
wherein the reaction vessel comprises a plurality of partition compartments, individual ones of the negative electrode plates are disposed in respective partition compartments of the reaction vessel, and said method comprises immersing individual ones of the electric conductors into an electrolyte in the respective partition compartments of the reaction vessel.

2. A method for producing a capacitor element, using a reaction vessel comprising two or more negative electrode plates each corresponding to individual electric conductors and two or more constant current sources electrically connected to individual negative electrode plates, which comprises filling the reaction vessel with an electrolyte, immersing in the electrolyte two or more electric conductors each having formed on the surface thereof a dielectric layer, and forming a semiconductor layer on the dielectric layer by passing an electric current through the electrolyte,
wherein the electric conductors are connected as a positive electrode and individual negative electrodes disposed in the reaction vessel are connected as a negative electrode,
wherein a constant electric current passes through individual ones of the two or more electric conductors in forming the semiconductor layer, and
wherein the reaction vessel comprises a plurality of partition compartments, individual ones of the negative electrode plates are disposed in respective partition compartments of the reaction vessel, and said method comprises immersing individual ones of the electric conductors into an electrolyte in the respective partition compartments of the reaction vessel.

3. The method as claimed in claim 1, wherein the constant current sources are constituted by two or more current regulative diodes with respective cathodes being electrically connected with each other and respective anodes being connected to the negative electrodes.

4. The method as claimed in claim 2, wherein the constant current sources are constituted by two or more current regulative diodes with respective cathodes being electrically connected with each other and respective anodes being connected to the negative electrodes.

5. The method as claimed in claim 1, wherein individual negative electrodes disposed on an inner part at the bottom of the reaction vessel are connected to individual anodes of the current regulative diodes disposed outside of the reaction vessel, and the cathodes of the current regulative diodes are electrically connected with one another, and whereby the current passed through the electrolyte is collected to a terminal.

6. The method as claimed in claim 2, wherein individual negative electrodes disposed on an inner part at the bottom of the reaction vessel are connected to individual anodes of the current regulative diodes disposed outside of the reaction vessel, and the cathodes of the current regulative diodes are electrically connected with one another, and whereby the current passed through the electrolyte is collected to a terminal.

7. The method as claimed in claim 1, wherein individual negative electrodes disposed on one surface of an insulating substrate and individual current regulative diodes disposed on a back surface of the insulating substrate are electrically connected through through holes, and the insulating substrate in which the through holes are sealed constitutes the bottom of the reaction vessel.

8. The method as claimed in claim 2, wherein individual negative electrodes disposed on one surface of an insulating substrate and individual current regulative diodes disposed on a back surface of the insulating substrate are electrically connected through through holes, and the insulating substrate in which the through holes are sealed constitutes the bottom of the reaction vessel.

9. The method as claimed in claim 5, wherein the negative electrode plate is a film-like metal material.

10. The method as claimed in claim 6, wherein the negative electrode plate is a film-like metal material.

* * * * *